A. ESHELMAN.
Trammer for Millstone-Spindles.

No. 169,157. Patented Oct. 26, 1875.

WITNESSES:
James T. Duhamel,
Thomas Byrne,

INVENTOR:
Abraham Eshelman,
Per H. S. Abbot.
Attorney.

UNITED STATES PATENT OFFICE.

ABRAHAM ESHELMAN, OF EARLVILLE, PENNSYLVANIA.

IMPROVEMENT IN TRAMMERS FOR MILLSTONE-SPINDLES.

Specification forming part of Letters Patent No. 169,157, dated October 26, 1875; application filed May 7, 1875.

*To all whom it may concern:*

Be it known that I, ABRAHAM ESHELMAN, of Earlville, county of Berks and State of Pennsylvania, have invented certain new and useful Improvements in Trammer for Millstone-Spindles, of which the following is a specification:

The nature of my invention consists in the construction and arrangement of a device for truing millstone-spindles, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
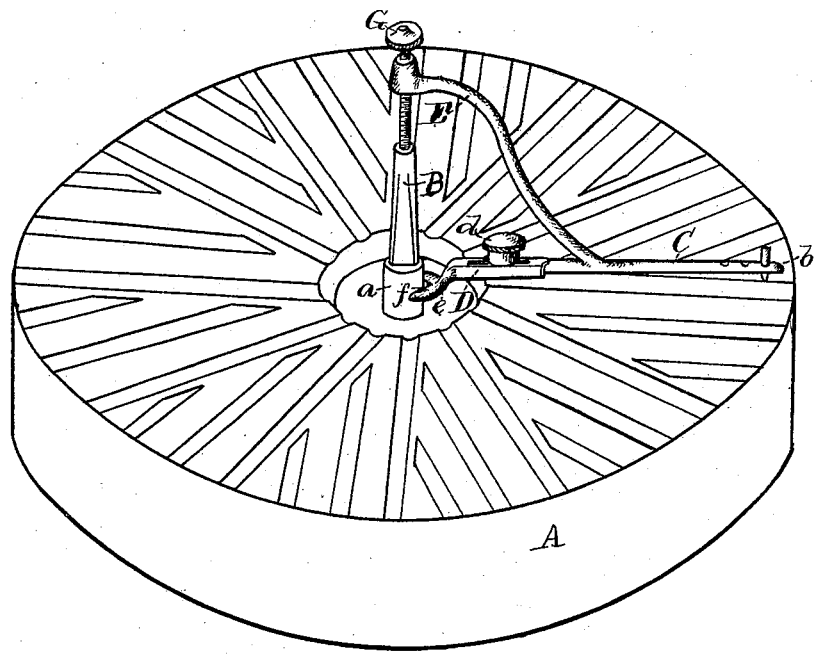
Figure 2:
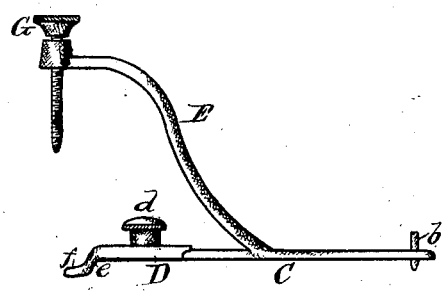
Figure 3:
Figure 3:
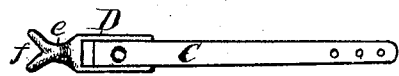

Figure 1 is a plan view of the under or stationary burr with the spindle and my invention in position thereon. Fig. 2 is a side elevation of the same. Fig. 3 is a longitudinal section of the trammer or truing device.

A represents the under or stationary burr of a pair of millstones, and B is the spindle passing through the eye thereof, and to which spindle the upper or running burr is to be fastened. The spindle B, being always turned true, has a recess in the end, and its circular portion $a$ is always perfectly concentric with said recess. The trammer consists of a straight bar or arm, C, in the outer end of which is made a series of holes for the insertion of a pin, $b$, of wood or other suitable material. On the inner end of the arm C is a slotted slide, D, fastened by means of set-screw $d$, and the end of this slide is curved downward, and then outward from the arm, the extreme end of the slide being forked, the two prongs of the fork standing at right angles with each other. To the arm or bar C is attached a curved arm, E, which extends upward and inward over the inner end of the arm C, and has a vertical set-screw, G, passed through its inner upper end. The stationary stone A having been made perfectly level by the usual means, the trammer is placed on the spindle B by inserting the pointed end of the set-screw G in the recess in the end of the spindle, and placing the forked end $f$ of the slide D on the round part $a$ of the spindle. The slide being bent at $e$, as described, the fork $f$ will get down into the eye of the stone A, and the arm C will extend radially over the stone. The pin $b$ is then inserted in the outer end of the arm C, when the trammer is swung around in a circle, the set-screw G acting as the pivot. The pin $b$ being set so that its lower end will almost touch the surface of the stone, it will readily be discovered whether the spindle is perfectly plumb or not.

By means of the adjustable bent slide D and the set-screw G the trammer can be adjusted to any millstone-spindle. The bend $e$ of the slide is of great importance, as the round portion $a$ of the spindle terminates in the eye of the stationary stone, and the fork $f$ of the slide must reach down to work on said round portion.

Having thus fully described my invention, what I claim as new, and desire to secure by Letters Patent, is—

1. In a trammer for millstone-spindles, the bar or arm C, and the adjustable slide D thereon, having the bend $e$ and fork $f$, substantially as and for the purposes herein set forth.

2. The combination of the bar C, with pin $b$, adjustable slide D, with bend $e$ and fork $f$, curved arm E, and set-screw G, all constructed substantially as and for the purposes herein set forth.

In testimony that I claim the foregoing as my invention I hereunto affix my signature this 4th day of May, 1875.

ABRA'M ESHELMAN.

Witnesses:
JAS. F. DUHAMEL,
THOMAS BYRNE.